United States Patent [19]
Murakata et al.

[11] Patent Number: 5,999,964
[45] Date of Patent: Dec. 7, 1999

[54] METHOD OF ACCESSING MESSAGE QUEUE AND SYSTEM THEREOF

[75] Inventors: Yahei Murakata, Odawara; Naofumi Shinya, Hiratsuka; Hiroya Tsuzuki; Mamoru Miyadate, both of Yokohama, all of Japan

[73] Assignee: Hitachi, Ltd., Tokyo, Japan

[21] Appl. No.: 08/766,851

[22] Filed: Dec. 13, 1996

[30] Foreign Application Priority Data

Dec. 14, 1995 [JP] Japan ................................. 7-325550

[51] Int. Cl.⁶ .................................................. G06F 15/163
[52] U.S. Cl. .......................... 709/201; 709/232; 710/52
[58] Field of Search ........................ 395/200.31, 200.33, 395/680, 200.47, 200.68, 200.36, 200.37; 710/52; 709/232, 201

[56] References Cited

U.S. PATENT DOCUMENTS

| | | | |
|---|---|---|---|
| 4,418,396 | 11/1983 | Hemdal et al. ........................ | 395/824 |
| 4,543,626 | 9/1985 | Bean et al. ........................ | 395/200.31 |
| 4,777,595 | 10/1988 | Strecker et al. .................... | 395/200.66 |
| 5,440,687 | 8/1995 | Coleman et al. ....................... | 709/230 |
| 5,555,396 | 9/1996 | Alferness et al. ..................... | 711/147 |
| 5,581,705 | 12/1996 | Passint et al. ....................... | 395/200.3 |
| 5,598,535 | 1/1997 | Brech et al. ........................... | 709/236 |
| 5,625,846 | 4/1997 | Kobayakawa et al. ................... | 710/52 |

*Primary Examiner*—Dung C. Dinh
*Attorney, Agent, or Firm*—Antonelli, Terry, Stout & Kraus, LLP

[57] ABSTRACT

A plurality of physically different queue files provided in a distributed processor node of a distributed processing system are regarded as a queue file group, and a message storage pointer and a message pick up pointer are provided in a message queue manager, and storing or picking up of a message is executed by a queue file indicated by the content of the message storage or pick up pointer, and the content of the pointer is updated every storing or picking up at the same time, so that access to a message queue in asynchronous storage type communication which can transfer a voluminous message without changing the application program is made possible.

9 Claims, 3 Drawing Sheets

METHOD OF ACCESSING MESSAGE QUEUE AND SYSTEM THEREOF

BACKGROUND OF THE INVENTION

1. Field of the Invention

The present invention relates to a distributed processing system associated with a plurality of distributed processor nodes and more particularly to a method and a system thereof for providing a message queue on a recording medium of each distributed processor node and transferring data (hereinafter referred to as a message) to be transferred between a message sender distributed processor node and a message receiver distributed processor node via this message queue.

Furthermore, the present invention belongs to a communication system for transferring a message asynchronously between a plurality of application programs (AP) on a distributed processing system via a message queue, and further relates to association with message bases, message queuing, and asynchronous storage type communication.

2. Description of the Prior Art

There are inter-program communication systems available in a conventional distributed processing system associated with a plurality of distributed processor nodes such as (1) an interactive communication system, (2) an RPC (remote procedure call) system on the basis of an X/Open distribution transaction process model, and (3) a file transfer system. The interactive communication system is a system in which a plurality of application programs (process programs) are associated with each other and a sender node notifies a receiver node of the sending of a message and sends a message when it receives a response to it. The RPC system is a system in which one application program requests a process for another application program and the process result of another application program is returned to the application program of the request source.

These communication systems are a synchronous communication systems which can communicate only when both the sender and receiver are activated at the same time. Namely, in these synchronous communication systems, it is necessary that both the sender and receiver are in operation at the same time and even if the self system is in operation, it is necessary to perform a sending process or receiving process depending on the status of the destination system.

The conventional type of information process is only a concentrated process by a main frame and a terminal. At present, however, the client server system is becoming a main system and the basis thereof is the distributed processing system. To construct a flexible and expandable system as a communication system in this distributed processing system, an example using a message queuing system for communicating asynchronously via a message queue is becoming popular rapidly.

In this case, there are characteristics of the distributed process such that standardization of an application program interface (API) is promoted, and when this API is used, development of an AP in distributed processor nodes can be realized by the same API, and the advantage of the distributed process can be obtained. Therefore, it disturbs the open distributed processing system to specify a peculiar API, so that it is necessary to avoid it.

The asynchronous storage type communication system has the aforementioned characteristics and is a communication system which is widely noticed recently for the reason that not only the system is applied to a field on the assumption of an asynchronous process such as the BPR (business process reengineering), work flow, or mobile communication field but also the program productivity is high because description of communication even in the existing communication field is easy and the API is under standardization and distributed processing systems using this system are increased mostly in Europe. This system is beginning to become popular also in Japan. Namely, a part of users are constructing such a system and many users are studying use of such a system.

As an example of this distributed processing system, there is an example of a parallel I/O network file server architecture disclosed in National Publication of PCT Patent No. 5-502525. In this example, prevention of contention between picking up an instruction by a microprocessor and transfer of a message and file data is intended.

The means for realizing the aforementioned distributed process are as shown below.

[1] Firstly, a message is stored in a logical queue which is called a queue comprising a physical file.

[2] The transfer function picks up a message connected to the queue by FIFO, and sends it to the queue of the predetermined destination, and stores it in the queue of the destination. As a sending method other than FIFO, for example, a method for sending by assigning priority or designating a specific message can be used.

[3] The queue stored in the destination queue is picked up sequentially starting from the longest connected message. It is also possible to pick up the specific message preferentially.

The queue in this system is a logical vessel which can store a message and is generally realized by a file on a magnetic disk.

There are the following two problems imposed in such a conventional queue access method.

(1) There is a limit (generally 4 GB: $2^{32}$ bytes) to the size which can be handled as a file. Therefore, when the upper limit of the size of one message which can be handled is increased (about 100 MB), the number of messages which can be registered in one queue file is necessarily reduced. Namely, in the aforementioned example, up to 40 messages can be registered.

(2) When the system registers or picks up a message, it accesses the queue file. However, during this period of time, the message locks the queue file. When the queue file is structured with a large vessel which is physically the same so as to handle voluminous data, the locking period during registration or picking up of a message is increased and if an attempt is made to pick up or register a message during this period of time, the inputs and/or outputs compete with each other, and the queue file cannot be accessed, and the application program (AP) is kept waiting.

As mentioned above, there is a limit to the size of a physical file which can be handled as a file. For example, since a size of 4 bytes is held, the upper limit is 4 GB ($2^{32}$ bytes). In the conventional system, the message queue comprises a physical file. However, as the size of a message to be handled increases, a case occurs that the "size of a message×No. of messages" cannot be put into a file entirely. To prevent it, a plurality of message queues are defined conventionally and a plurality of message queues are realized by a plurality of queue files.

When one queue file is provided, the AP accessing this queue file locks it during storing or picking up a message, so that a problem arises that even if an attempt is made to pick up or store a message from or into the queue file, the accesses compete with each other and an I/O neck is caused. Furthermore, even if the vessel (recording medium) is made larger physically so as to handle voluminous data, a problem also arises that when the recording medium is the same, the accesses compete with each other and an I/O bottleneck is caused.

SUMMARY OF THE INVENTION

An object of the present invention is to eliminate the difficulties of the prior art described above when the asynchronous storage type communication is applied in the field handling a voluminous message which is a new application field.

Another object of the present invention is to provide an asynchronous storage type communication system which can perform a sending process or receiving process without depending on the status of the destination system via a queue if the self system is in operation, even if both the sender and receiver are not in operation at the same time and wherein a voluminous message can be handled.

An object of the asynchronous storage type communication system of the present invention which is a communication system for performing asynchronous storage type communication comprising three processes in which the message sender stores a message which is a content of communication in a message queue and ends the process, and then the transfer function which is independent of the communication source picks up the message input to the message queue, transfers it to the destination designated by the sender beforehand, stores it in the destination queue, and ends the process, and furthermore the receiver picks up the message from the queue when the message is input to the queue, thus providing a method for eliminating the limitations (for example, when a certain queue file is filled up, it is necessary to switch it to another queue file) due to the physical size of the queue file for storing a message, realizing reduction in competition of I/O processes when a message is stored into or picked up from the queue, and realizing the reduction without changing the interface of a user (AP).

To accomplish the above objects, the present invention is an access method for a message queue and a system thereof in a distributed processing system which connects a plurality of distributed processor nodes via a transmission line, wherein a plurality of queue files comprising files for storing messages to be stored on at least one recording medium in at least one distributed processor node respectively are set and a queue file group is formed, and the plurality of queue files included in the queue file group are put in order, and a message storage pointer for pointing to a queue file for storing a message and a message pick up pointer for pointing to a queue file for picking up a message are set in the aforementioned at least one distributed processor node. When a message is stored in a queue file, it is stored in the queue file pointed to by the aforementioned message storage pointer and the content of the message storage pointer is updated to the next queue file at the same time, and when a message is picked up from a queue file, it is picked up from the queue file pointed to by the aforementioned message pick up pointer and the content of the message pick up pointer is updated to the next queue file at the same time.

The above will be described more specifically below.

To solve the problem that if voluminous data is handled when a vessel (recording medium) which is physically the same is used, the accesses compete with each other, the present invention provides a plurality of queue files, provides a message storage pointer which is a pointer for storing the queue file which is a current file when a message is stored in the message queue, stores a message in the queue file indicated by this pointer, and registers the next queue file sequentially in the message storage pointer after storing the message so as to store messages sequentially.

The present invention provides a message pick up pointer which is a pointer for storing the queue file which is a current file when a message is picked up from a queue file, picks up a message from the queue file indicated by this pointer, and registers the next queue file sequentially in the message pick up pointer after picking up the message so as to pick up messages sequentially.

The present invention having the aforementioned constitution can reduce access competitions for the same queue file.

To solve the aforementioned problems, the present invention is a distributed processing system associated with a plurality of distributed processor nodes, wherein a message queue is provided on the recording medium of each distributed processor node, for an access method for the message queue for transferring a message which is data to be transferred between the message sender distributed processor node and the message receiver distributed processor node via the message queue, a plurality of queue files which are physical vessels constituting the message queue for storing messages in the distributed processor node are provided on the recording medium, these plurality of queue files being grouped and handled regarding as a queue file group which is logically a queue file. The plurality of queue files included in this queue file group are put in order, and a message storage pointer for pointing to a queue file for storing a message and a message pick up pointer for pointing to a queue file for picking up a message are provided. When a message is to be stored in a queue file, it is controlled so as to store it in the queue file pointed to by the message storage pointer with reference to the message storage pointer and to update the content of the message storage pointer to the next queue file. When a message is to be picked up from a queue file, it is controlled so as to pick up it from the queue file pointed to by the message pick up pointer with reference to the message pick up pointer and send it to the receiver and to update the content of the message pick up pointer to the next queue file.

According to the present invention, in the aforementioned access method for the message queue, the plurality of queue files included in the queue file group are put in order by numbering them from 1 to n.

Furthermore, in the aforementioned access method for the message queue, the message storage order into the queue files is such that a message is stored in the first queue file first, and when a message is to be stored next, it is stored in the second queue file, and after a message is stored in the n-th queue file, a message is stored in the first queue file.

In the aforementioned access method for the message queue, when a message which is larger than the size of the file queue is to be stored, at the point of time when the file queue pointed to by the message storage pointer is filled up, the message is stored continuously into the next file queue and the message storage pointer is updated at the same time.

In the aforementioned access method for the message queue, message transfer is executed by an asynchronous storage type process.

According to the present invention, a plurality of queue files are grouped and handled as a queue file. Therefore, when they are viewed from a user (AP), they can be handled as a queue, so that limitations to the size and number of messages can be eliminated.

It is necessary to realize the API when the aforementioned system is to be realized by an interface which is the same as the conventional one.

The API when a message is stored or picked up will be described hereunder.

A message is stored in the queue and an interface for picking up is provided, for example, by PUT and GET. PUT comprises a queue name, a message storage area, . . . and GET comprises a queue name, a message pick up area, . . . In the conventional system, the queue names have a one-to-one correspondence with the file names, and the PUT format is generally used for storing, and the GET format is used for picking up.

Even group definition, the present invention can realize the API by an interface which is the same as the conventional one.

According to the present invention, when the correspondence between queue names and queue file names is 1:n (n>1) (queue file group), the function (PUT) for message storage stores a message in the queue file name pointed to by the message storage pointer first. When the correspondence between queue names and queue file names is 1:1, the storage method is the same as the conventional one.

When the correspondence between queue names and queue file names is 1:n (n>1) (queue file group), the function (GET) for message pick up also picks up a message from the queue file name pointed to by the message pick up pointer. When the correspondence between queue names and queue file names is 1:1, the storage method is the same as the conventional one.

Next, the next message storage pointer is set because the message is stored and the queue file name for storing a message is stored in the queue file pointed to by the message storage pointer. The message storage pointer is changed and used cyclically hereinafter in the same way. Picking up of messages is executed by changing the message pick up pointer sequentially in the same way as with storage.

By doing this, according to the present invention, in the distributed processing system, a plurality of queue files which are physical vessels for storing messages are provided on the recording medium as a means for enabling the asynchronous storage type process and they are grouped and handled as a queue file group which is a logical queue file, so that voluminous data which cannot be handled by a queue file due to the limit to the physical size can be handled, and furthermore the probability of competition of storage processes (I/O) when messages are stored in the queue files is reduced, and the probability of competition of pick up processes (I/O) when messages are picked up from the queue files is also reduced, and when a user (application program) of the queue stores a message in the queue, he can access it by the same interface as that of access to a queue file without taking account of that a plurality of queue files are provided.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Figure 1:
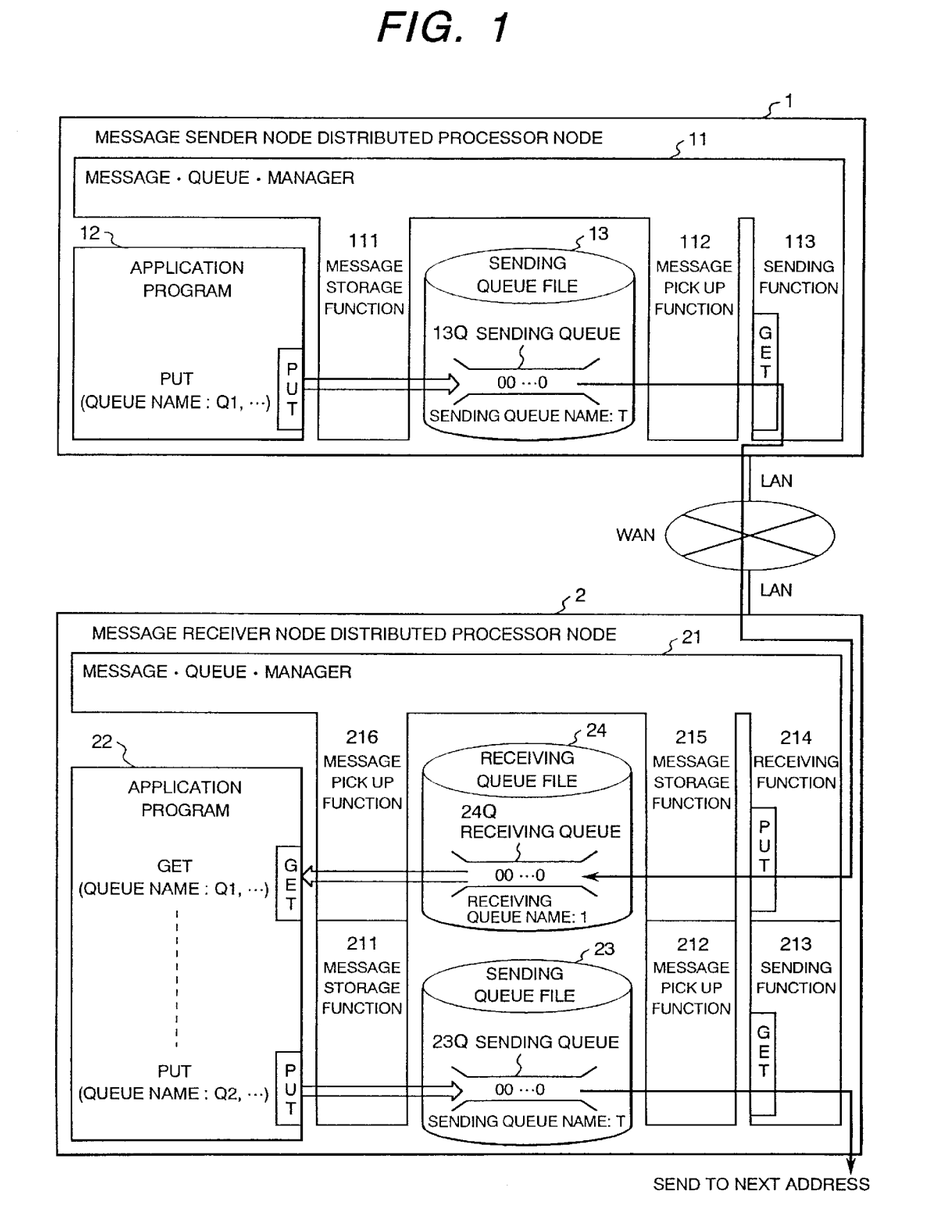
FIG. 1 is a system schematic view showing an example of a distributed processing system to which the present invention is applied.

The access method for the message queue and system thereof of the present invention will be explained hereunder with reference to FIGS. 1 to 3. FIG. 1 shows an example of the constitution of a distributed processing system to which the present invention is applied. In this distributed processing system, a distributed processor node 1 which is a message sender and a distributed processor node 2 which is a message receiver are associated with each other via a LAN and a WAN.

The message sender 1 has a message queue manager 11, an application program (AP) 12, and a sending queue file 13 and the message queue manager 11 has a message storage function 111, a message pick up function 112, and a sending function 113. The sending queue file 13 has a sending queue 13Q with a predetermined size (for example, 4 GB) of queue name T.

The message receiver 2 has a message queue manager 21, an application program (AP) 22, and a receiving queue file 24 and the message queue manager 21 has a receiving function 214, a message storage function 215, and a message pick up function 216.

Furthermore, when the message receiver 2 has a transfer function, it has a sending queue 23 in addition to the aforementioned constitution and the message queue manager 21 has a message pick up function 211 and a message storage function 212 in addition to the aforementioned function.

The application program (AP) 12 of the message sender 1 designates a destination queue name 1 and stores it in the sending queue 13 of the queue name T by the function (PUT) which is a control function provided by the message queue manager 11 so as to send a message to the destination. The message queue manager 11 saves the stored message in the sending queue 13Q. The message stored in the sending queue 13Q is picked up by the function (GET) provided by the message queue manager 11 and the sending function 113 sends the message to a destination queue (receiving queue) 24Q of the message receiver 2. If the destination queue is not in operation, the message queue manager 11 sends the message when the destination enters the operation state.

On the other hand, when a message is sent from the message sender 1, the message queue manager 21 of the message receiver 2 reads a receiving queue name Q1 assigned to the message and stores the message in the receiving queue 24Q of the receiving queue name Q1 in the receiving queue file 24 by the PUT.

The application program (AP) 22 of the message receiver 2 issues the function (GET) provided by the message queue manager 21 so as to receive a message and stands by so as to pick up a message from the receiving queue file 24.

The receiving function 214 of the message receiver 2 receives a message sent by the sending function 113 of the message sender 1 and stores it in the receiving queue 24Q. When the message is stored in the receiving queue 24Q, the message queue manager 21 of the message receiver 2 detects it and activates the the AP 22 waiting so as to receive the message. The activated AP 22 picks up and processes the message from the receiving queue 24Q of the queue name Q1 of the receiving queue file 24.

When the message receiver 2 transfers it to a further destination, the message receiver 2 processes the received message in the same way as with the message sender 1 and sends it to another destination.

According to this system, a plurality of distributed processing systems can transfer messages between them via a queue. At this time, the AP of each distributed processing system is not required to take account of whether the operation status of the message receiver and the status of the communication path are normal or faulty and is not required to describe a protocol for communicating and program logic for communication.

As mentioned above, the present invention is a distributed processing system associated with a plurality of distributed processor nodes, wherein a message queue is provided on the recording medium of each distributed processor node. For an access method for the message queue for transferring a message which is data to be transferred between the message sender distributed processor node and the message receiver distributed processor node via the message queue, a plurality of queue files which are physical vessels constituting the message queue for storing messages in the distributed processor node are provided on the recording medium, and these plurality of queue files are grouped and handled as a queue file group which is logically a queue file. The plurality of queue files included in this queue file group are put in order, and a message storage pointer for pointing to a queue file for storing a message and a message pick up pointer for pointing to a queue file for picking up a message are provided when a message is to be stored in a queue file, it is controlled so as to store it in the queue file pointed to by the message storage pointer with reference to the message storage pointer and to update the content of the message storage pointer to the next queue file. When a message is to be picked up from a queue file, it is controlled so as to pick up it from the queue file pointed to by the message pick up pointer with reference to the message pick up pointer and send it to the receiver and to update the content of the message pick up pointer to the next queue file.

According to the present invention, in the aforementioned access method for the message queue, the plurality of queue files included in the queue file group are put in order by numbering them from 1 to n.

Furthermore, according to the present invention, in the aforementioned access method for the message queue, the message storage order into the queue files is such that a message is stored in the first queue file first, and when a message is to be stored next, it is stored in the second queue file, and after a message is stored in the n-th queue file, a message is stored in the first queue file.

According to the present invention, in the aforementioned access method for the message queue, when a message larger than the size of the file queue is to be stored, at the point of time when the file queue pointed to by the message storage pointer is filled up, the message is stored continuously into the next file queue and the message storage pointer is updated at the same time.

Furthermore, according to the present invention, in the aforementioned access method for the message queue, message transfer is executed by an asynchronous storage type process.

Figure 2:
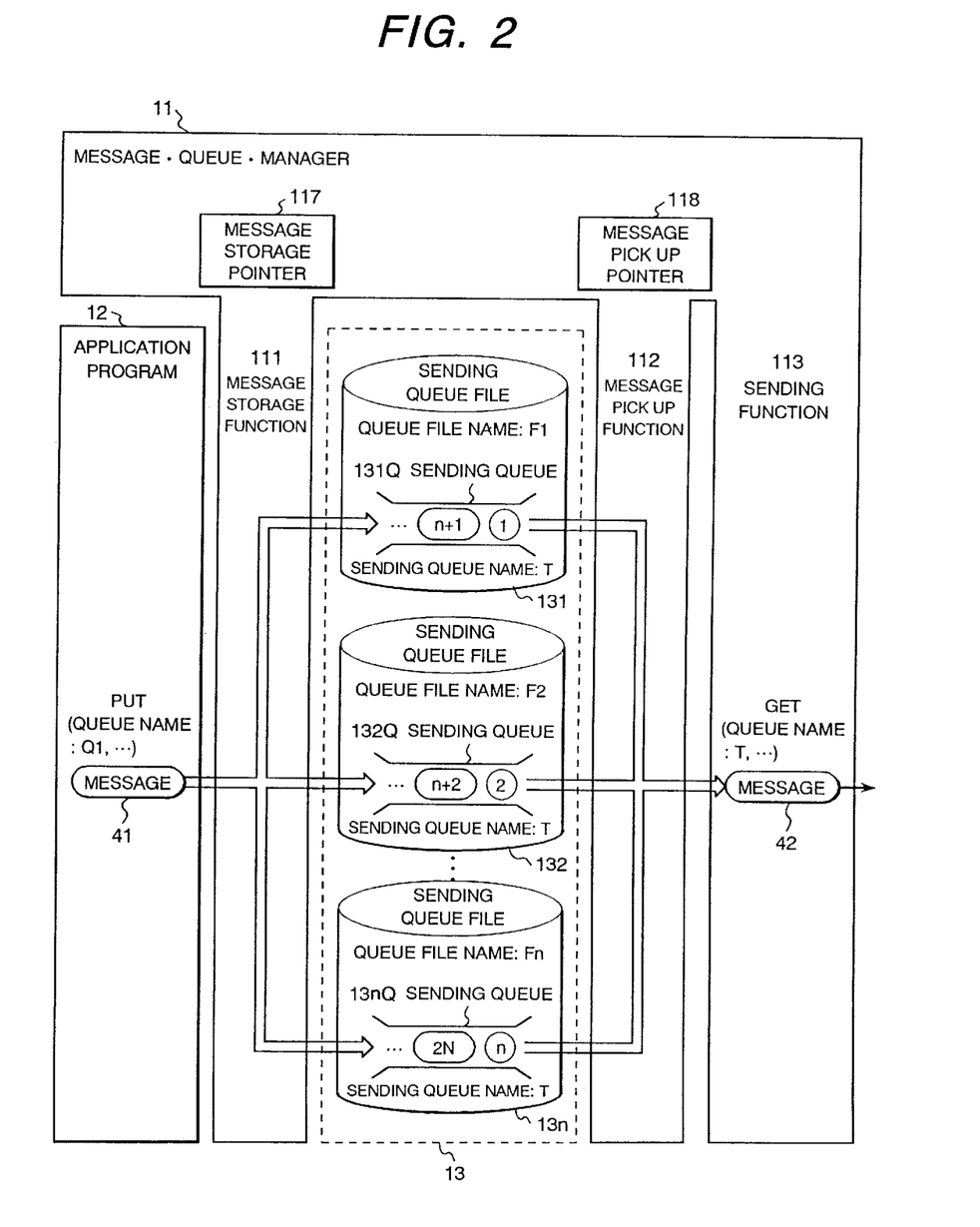
FIG. 2 is a schematic view for explaining the file constitution of a message sender to which the present invention is applied and a process of storing and picking up a message to be sent into and from a queue.

FIG. 2 shows an example of the message sender 1 which has a plurality of queue files and can send voluminous data with a size than the capacity of all the sending queues of the queue files which are regarded as a queue and shows a method for storing a message in a plurality of queues by the application program (AP) 12 and picking up the message by the message queue manager 11 so as to send it to the receiving queue 24Q of the message receiver 2.

The message queue manager 11 has a control function comprising the aforementioned message storage function 111, message pick up function 112, and sending function 113, a message storage pointer 117, and a message pick up pointer 118.

The sending queue file 13 comprises a plurality of queue files 131, 132, . . . , and 13n with queue file names F1, F2, . . . , and Fn assigned. The sending queue files 131, 132, . . . , and 13n are provided with sending queues 131Q, 132Q, . . . , and 13nQ with a sending queue name T assigned respectively. The n sending queues 131Q, 132Q, . . . , and 13nQ are grouped and they are seen as a sending queue from the application program 12. The grouped queues are referred to as a queue file group. The queue file 13 generally exists on a secondary recording medium (DK).

The message queue manager 11 has the message storage pointer 117 for pointing to a sending queue file name for storing a message 41 and the message pick up pointer 118 for pointing to a sending queue file name for picking up a message. When the storage or pick up of the message ends, each pointer is controlled so as to point to the next sending queue file name.

Namely, the message queue manager 11 controls so as to put the sending queue files of the queue file group 13 in order such as queue file 1, queue file 2, . . . , and queue file n and store or pick up messages in or from the queue files in the order of 1->2->. . . ->n->1->2->. . . .

The AP (user) 12 requests a process of designating the receiving queue name Q1 of the message receiver 2 and storing the message 41 in the sending queue file 13 by the PUT for the message queue manager 11.

The message queue manager 11 refers to the message storage pointer 117 and stores the message in one of the sending queue files 131Q, 132Q, . . . , and 13nQ pointed to by this pointer. After the message queue manager 11 stores the message 41, it changes the content of the message storage pointer 117 so as to point to the next sending queue file name. When the stored sending queue file is the last sending queue file 13nQ which is put in order, the message queue manager 11 changes the content of the message storage pointer 117 to the sending queue file 131Q at the beginning. To store messages cyclically in the sending queue files like this, the present invention newly provides the message storage pointer 117.

When a plurality of queue files are defined as a group, if the queue files are defined on another recording medium on which each queue file can be accessed independently, competition of storage and pick up during access can be avoided and a more satisfactory effect can be obtained.

Conventionally, when a message comprises a physical sending queue file name having a logical sending queue name, the message queue manager 11 stores or picks up the message by designating the sending queue name. However, according to the present invention, when a plurality of queue files are defined as a group, a user executes a process of storing or picking up a message by designating the queue name thereof. By this process, the message queue manager 11 stores or picks up the message in or from the predetermined sending queue depending on the content of the message storage pointer 117 or the message pick up pointer 118.

Next, when a message pick up request is issued from the message sender 2, the message queue manager 11 supplies the pick up function (GET) to the message pick up function 112. The message pick up function 112 receiving the GET picks up a message from the sending queue pointed to by the message pick up pointer 118 among the queue file names F1, F2, . . . , and Fn. A message 42 picked up from the sending queue is sent to the designated receiving queue Q1 of the message receiver 2 by the sending function 113.

The message pick up pointer 118 points to the queue file name from which a message is to be picked up next and when the message is picked up, the message queue manager 11 updates the content thereof and points to the next queue file. When the sending queue file which sends the message is the last sending queue file 13nQ which is put in order, the message queue manager 11 changes the content of the message pick up pointer 118 to the sending queue file 131Q at the beginning.

The message pick up order is controlled so that messages are picked up in the order in which they are stored by the message pick up pointer 118.

By this process, a message larger than the size of each queue can be sent and the message queue can be set to a suitable size at the same time, so that the I/O occupying time is shortened and even if the storing of a voluminous message in all of the queues is not completed, it can be picked up immediately when the writing of a part of the message into a message queue is complete and the standby time can be shortened.

Even if there are a plurality of messages smaller than the size of message queue, when the storing of a message ends, the process of storing the next message in the next message queue can be performed, so that the previous message can be picked up during storing of the next message and the standby time can be shortened.

Figure 3:
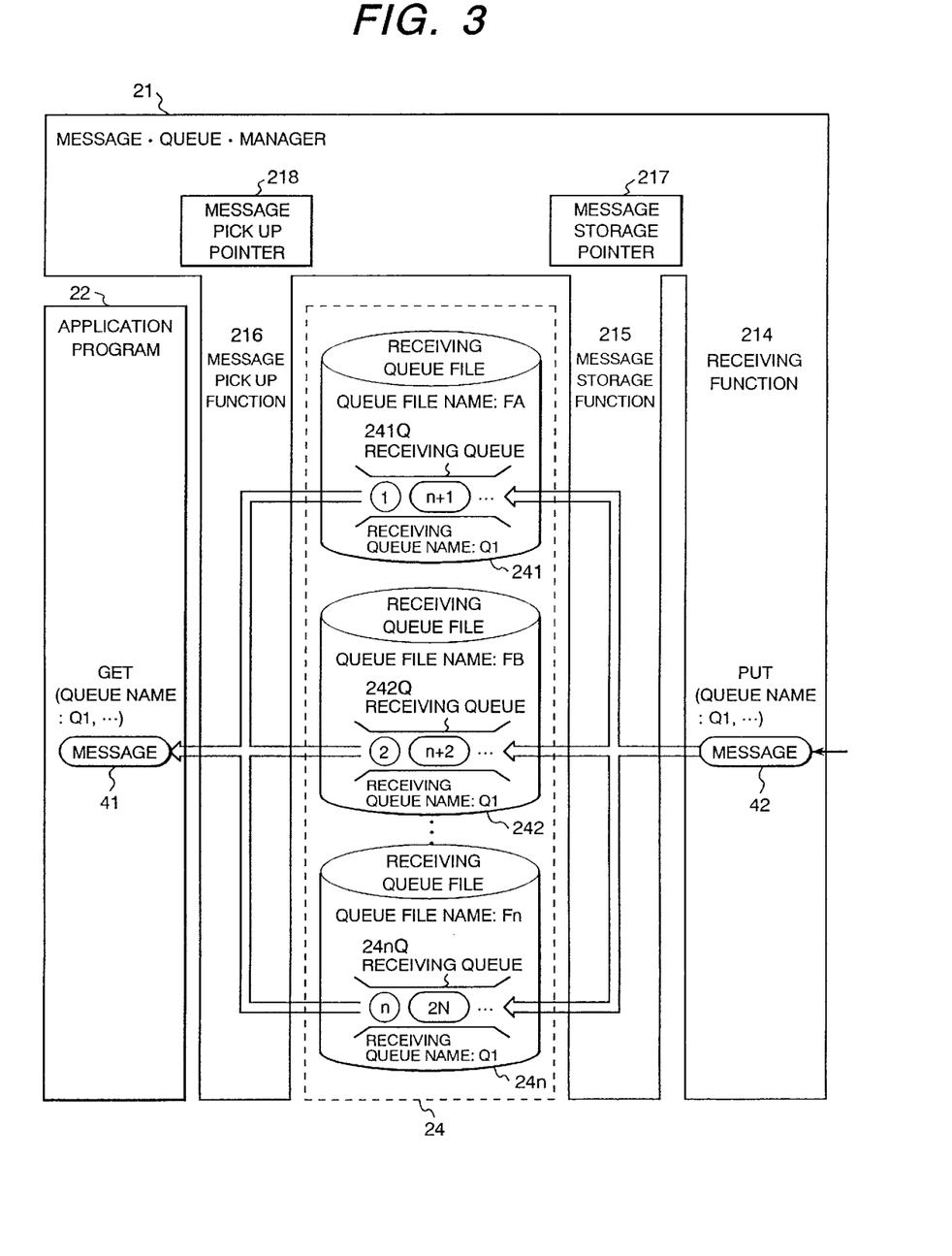
FIG. 3 is a schematic view for explaining the file constitution of a message receiver to which the present invention is applied and a process of storing and picking up a received message into and from a queue.

FIG. 3 shows an example of the message receiver 2 which has a plurality of receiving queue files and can receive a message with a size greater than the capacity of all the receiving queues of the receiving queue files which are regarded as a queue and shows a method for storing voluminous messages sequentially in a plurality of receiving queues 241Q, 242Q, . . . , and 24nQ by the message queue manager 21 and picking up a message from the receiving queue 24 of the message receiver 2 by the application program (AP) 12.

Also in this case, the process of storing and picking up messages is executed in the same way as the process of the message sender 1 shown in FIG. 2.

By doing this, the problem of "the size which can be handled as a file is limited" in the conventional system can be solved by constituting and grouping receiving queue files with a plurality of queue files and using them as a queue file group.

The problem that when a message is stored or picked up, a queue file is accessed, so that the file and message are locked, and when a message comprises a vessel which is physically the same so as to handle voluminous data, the accesses compete with each other and an I/O bottleneck is caused, and the process/application program (AP) is kept waiting during storing or picking up a message can be avoided by storing or picking up messages by distributing them into a plurality of queues cyclically.

According to the present invention, a method that sending queues or receiving queues which are taken account of by a user are used as a queue file group comprising a plurality of queue files is used, so that the limits to the size and number of messages which can be handled by a message queue can be eliminated.

Furthermore, according to the present invention, a system that accesses (GET, PUT) messages are switched automatically and cyclically to the queue file on another medium for each message is used, so that the possibility of waiting for I/O when the next message is to be accessed and waiting due to lock control is reduced and the performance for access is improved remarkably.

When a plurality of queue files are assigned onto another medium on which they can be accessed independently of each other, as the amount of a message increases, the access performance can be improved more compared with the conventional one.

Furthermore, according to the present invention, a user (application program) can access unifyingly by the same interface (API) as that of the conventional system and an increase in the burden when a program is generated is eliminated. Even if the queue file constitution is pluralized during operation, there is no need to change the apparent queue file constitution, so that there is no need to change the program and hence there is an advantage of easy to use.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A message queue writing method for a computer coupled with another computer via a network, said method comprising the steps of:

setting at least one queue group which includes a plurality of queues for storing messages to be stored on a plurality of recording media respectively;

putting said plurality of queues included in said queue group in order;

setting a message storage pointer for pointing to a certain queue in said queue group, for storing a message;

storing said message to be stored in said certain queue;

setting the next message storage pointer for pointing to a queue next to said certain queue, for storing the next message; and storing the next message to be stored in said queue next to said certain queue.

2. A message queue access method for a computer coupled with another computer via a network, said method comprising the steps of:

setting at least one queue group which includes a plurality of queues for storing messages stored on a plurality of recording media respectively;

putting said plurality of queues included in said queue group in order;

setting a message pick up pointer for pointing to a certain queue in said queue group, for picking up a message;

picking up said message from said certain queue;

setting the next message pick up pointer for pointing to a queue next to said certain queue, for picking up the next message; and a step of picking up the next message from said queue next to said certain queue.

3. A message queue access method for a computer coupled with another computer via a network, said method comprising the steps of:

setting at least one queue group which includes a plurality of queues for storing messages stored/to be stored on a plurality of recording media respectively;

putting said plurality of queues included in said queue group in order;

setting at least one of a message storage pointer and a message pick up pointer, for pointing to a certain queue in said queue group, for picking up/storing a message;

picking up/storing said message from/to said certain queue;

setting at least one of a next message storage pointer and a next message pick up pointer, for pointing to a certain queue in said queue group, for picking up/storing the next message; and picking up/storing the next message from/to said queue next to said certain queue.

4. A message queue writing system, comprising:

a computer;

another computer coupled to said computer via a network;

means for setting at least one queue group which includes a plurality of queues for storing messages to be stored respectively on a plurality of recording media;

means for putting said plurality of queues included in said queue group in order;

means for setting a message storage pointer for pointing to a certain queue in said queue group, for storing a message;

means for storing said message to be stored in said certain queue;

means for setting the next message storage pointer for pointing to a queue next to said certain queue, for storing the next message; and means for storing the next message to be stored in said queue next to said certain queue.

5. A message queue access system, comprising:

a computer;

another computer coupled to said computer via a network;

means for setting at least one queue group which includes a plurality of queues for storing messages stored on a plurality of recording media respectively;

means for putting said plurality of queues included in said queue group in order;

means for setting a message pick up pointer for pointing to a certain queue in said queue group, for picking up a message;

means for picking up said message from said certain queue;

means for setting the next message pick up pointer for pointing to a queue next to said certain queue, for picking up the next message; and means for picking up the next message from said queue next to said certain queue.

6. A message queue access system, comprising:

a computer;

another computer coupled to said computer via a network;

means for setting at least one queue group which includes a plurality of queues for storing messages stored/to be stored on a plurality of recording media respectively;

means for putting said plurality of queues included in said queue group in order;

means for setting at least one of a message storage pointer and a message pick up pointer, for pointing to a certain queue in said queue group, for picking up/storing a message;

means for picking up/storing said message from/to said certain queue;

means for setting at least one of a next message storage pointer and a next message pick up pointer, for pointing to a certain queue in said queue group, for picking up/storing the next message; and means for picking up/storing the next message from/to said queue next to said certain queue.

7. A program product for use with a computer, comprising:

a computer readable medium with a computer program recorded thereon, said program including:

a first process for causing the computer to set at least one queue group which includes a plurality of queues for storing messages to be stored on a plurality of recording media respectively;

a second process for causing the computer to put said plurality of queues included in said queue group in order;

a third process for causing the computer to set a message storage point for pointing to a certain queue in said queue group, for storing a message;

a fourth process for causing the computer to store said message to be stored in said certain queue;

a fifth process for causing the computer to set the next message storage pointer for pointing to a queue next to said certain queue, for storing the next message; and a sixth process for causing the computer to store the next message to be stored in said queue next to said certain queue.

8. A program product for use with a computer, comprising:

a computer readable medium with a computer program recorded thereon, said program including:

a first process for causing the computer to set at least one queue group which includes a plurality of queues for storing messages stored on a plurality of recording media respectively;

a second process for causing the computer to put said plurality of queues included in said queue group in order;

a third process for causing the computer to set a message pick up pointer for pointing to a certain queue in said queue group, for picking up a message;

a fourth process for causing the computer to pick up said message from said certain queue;

a fifth process for causing the computer to set the next message pick up pointer for pointing to a queue next to said certain queue, for picking up the next message; and a sixth process for causing the computer to pick up the next message from said queue next to said certain queue.

9. A program product for use with a computer, comprising:

a computer readable medium with a computer program recorded thereon, the program including:

a first process for causing the computer to set at least one queue group which includes a plurality of queues for storing messages stored/to be stored on a plurality of recording media respectively;

a second process for causing the computer to put said plurality of queues included in said queue group in order;

a third process for causing the computer to set at least one of a message storage pointer and a message pick up pointer, for pointing to a certain queue in said queue group, for picking up/storing a message;

a fourth process for causing the computer to pick up/store said message from/to said certain queue;

a fifth process for causing the computer to set at least one of a next message storage pointer and a next message pick up pointer, for pointing to a certain queue in said queue group, for picking up/storing the next message; and a sixth process for causing the computer to pick up/storing the next message from/to said queue next to said certain queue.

* * * * *